United States Patent [19]

Farstad et al.

[11] 4,090,135
[45] May 16, 1978

[54] WIRELESS FSK TECHNIQUE FOR TELEMETERING UNDERGROUND DATA TO THE SURFACE

[75] Inventors: Arnold J. Farstad, Boulder; Carl Fisher, Jr., Louisville, both of Colo.

[73] Assignee: The United States of America as represented by the Secretary of the Interior, Washington, D.C.

[21] Appl. No.: 741,101

[22] Filed: Jun. 29, 1976

[51] Int. Cl.² ............................................ H04B 13/02
[52] U.S. Cl. ............................................ 325/28; 325/30; 325/186; 325/320
[58] Field of Search ............ 325/28, 30, 320, 163, 325/185, 186; 333/71; 178/66 R, 88; 358/257

[56] References Cited

U.S. PATENT DOCUMENTS

| | | | |
|---|---|---|---|
| 2,389,432 | 11/1945 | Hansell | 325/28 |
| 2,499,195 | 2/1950 | McNiven | 325/28 |
| 2,992,325 | 7/1961 | Lehan | 325/28 |
| 3,336,571 | 8/1967 | Johnson | 178/66 R |
| 3,454,718 | 7/1969 | Perreault | 178/66 R |
| 3,513,415 | 5/1970 | Dostal | 333/71 |
| 3,655,914 | 4/1972 | Gifft | 358/257 |
| 3,953,798 | 4/1976 | Stostrand | 325/320 |
| 3,987,406 | 11/1976 | Broding | 325/30 |
| 3,991,389 | 11/1976 | Dwire | 178/66 R |
| 4,016,532 | 5/1977 | Rose | 325/30 |

*Primary Examiner*—Robert L. Griffin
*Assistant Examiner*—Michael A. Masinick
*Attorney, Agent, or Firm*—Thomas Zack; Donald A. Gardiner

[57] ABSTRACT

A Frequency Shift Keying (FSK) system to transmit and receive data as a sequence of dual frequency short duration tone bursts. Normally the data is transmitted from an underground location, as in a mine, to the surface or to another underground location. At the receiving end the transmitted data is detected as marks or spaces that are used to clock the appropriate data bits into a storage shift register. Erroneous data from wideband noise transients at the receiver are eliminated by the use of an exclusive OR circuit which permits shift pulses to appear at the data register only when one or the other of the two shift pulses are present but not both. To further insure accurate copy of the digital data at the receiver, a receiver alert code is transmitted prior to the telemetering of the actual data. Only after recognition of the receiver alert code is the receiver able to receive the transmitted data bit stream.

6 Claims, 2 Drawing Figures

WIRELESS FSK TECHNIQUE FOR TELEMETERING UNDERGROUND DATA TO THE SURFACE

BACKGROUND OF THE INVENTION

1. Field of the Invention

Our invention is a wireless modulated carrier wave communication system in which a separated transmitter and receiver transmit and receive digital data through the earth.

2. Description of the Prior Art

The transmission of data from one underground station to another station can be found in many references such as those found in class 325, sub-class 28 of the U.S. patent classification definitions. Three examples are U.S. Pat. Nos. 2,389,432, 2,499,195, and 2,992,325 to C. W. Hansell, J. A. McNiven, and F. W. Lehan, respectively. In none of these systems is a FSK system with short tone bursts of short duration used to transmit and receive data. In those systems employing FSK techniques the signals are transmitted on 100 percent of the duty cycle per channel. These types of systems can be found in the U.S. Pat. having Nos. 3,717,844 and 3,924,065 to Barret et al and Charles C. Freeny, respectively. The distinguishing characteristics of our FSK system over these are our shorter cycles with short tone bursts, our receiver alert code, and our noise suppressing network. None of the known prior art has all or most of the features found in our invention.

The unique combination of features present in our invention allows us to operate a long life battery powered telemetry transmitter in a mine which is virtually uneffected by noise transients. To be sure that these signals are accurately received, a receiver alert code is transmitted prior to the actual data.

SUMMARY OF THE INVENTION

The underground FSK data transmission and receiving system forming our invention sends out tone bursts from its own self contained power source. These signals are made up of distinct narrow dual frequency shift pulses which operate over about ten percent of the total duty cycle. Normally, the duration of the tone bursts is no more than 100 milliseconds. At the receiver an exclusive OR gate circuit prevents false triggering by local noise transients by preventing their passage when both of the distinct shift pulses are present at said gate.

The principle object of this invention is an improved underground data transmission system.

Figure 1:
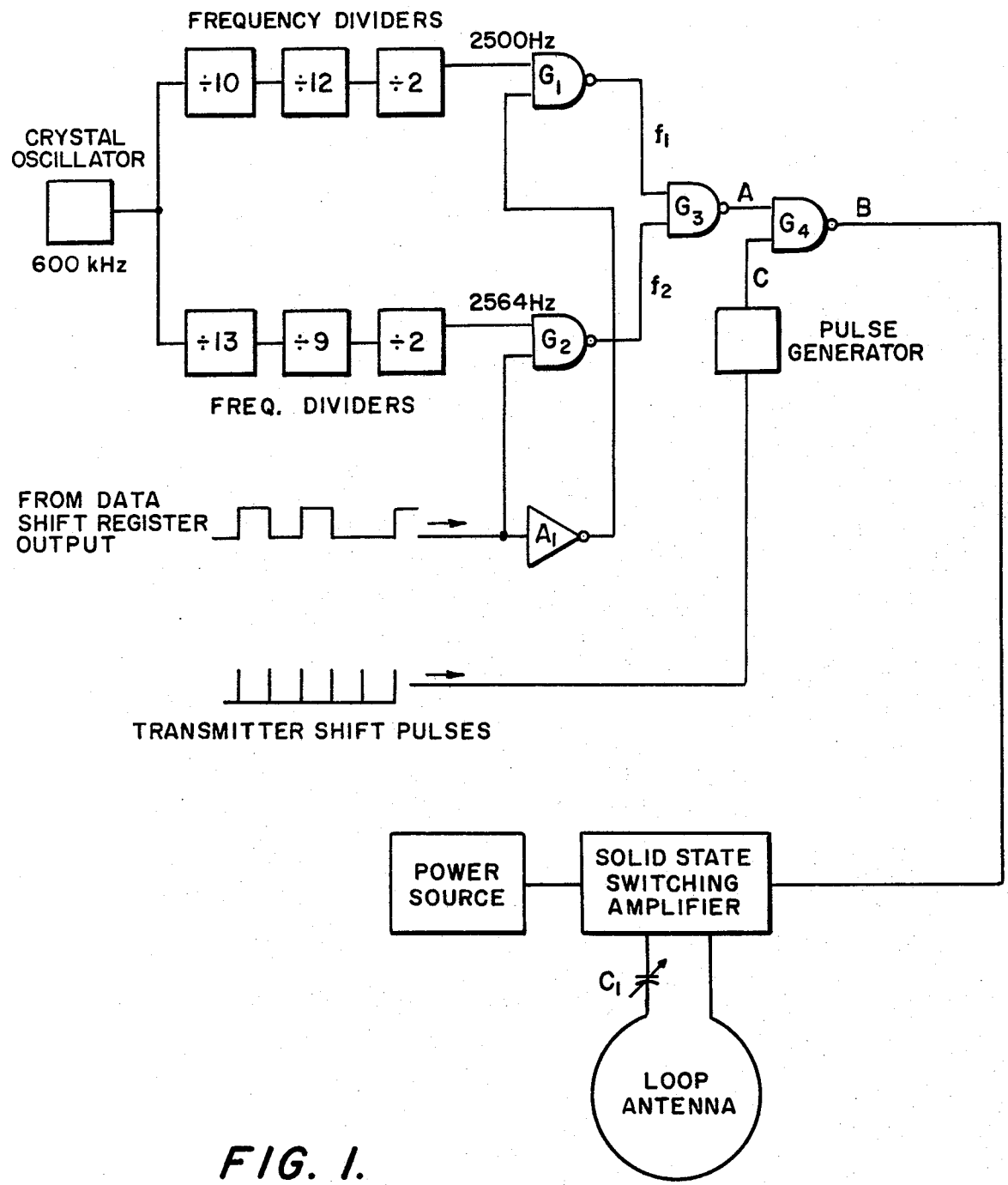
FIG. 1 is a block diagram of the preferred embodiment of the FSK telemetry transmitter.
Figure 2:
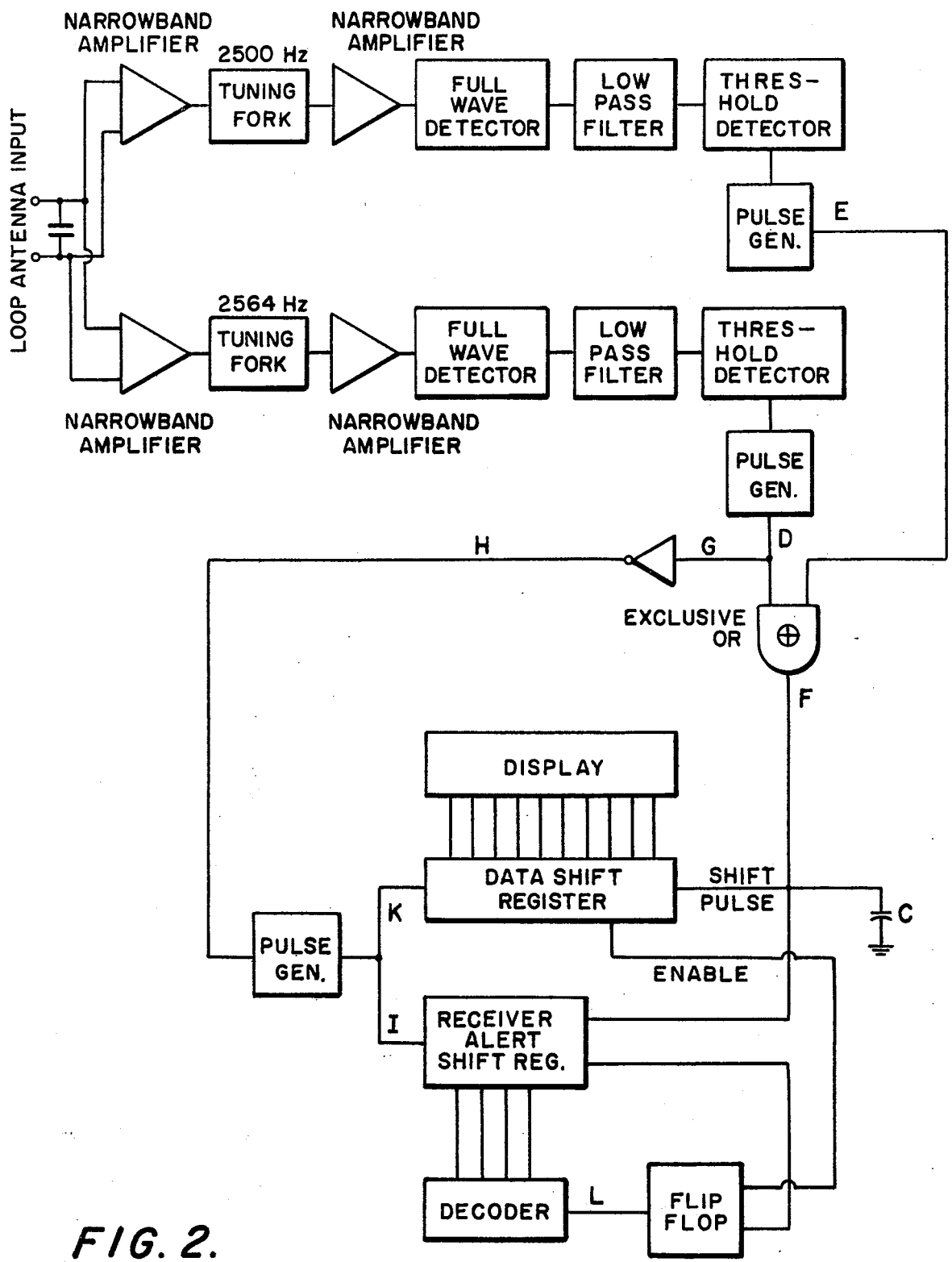
FIG. 2 is a block diagram of the preferred embodiment for the FSK telemetry receiver.

The preferred embodiment of our invention as depicted in FIGS. 1 and 2 has been used to continuously monitor mine conditions. More specifically, it has been used to telemeter digital data representing mine roof microseimic noise from a gassy area of a coal mine to a monitoring station either on the surface or at a fresh air location in the mine. In such a set up it is necessary that the telemetry transmitter be battery powered with sufficient range to provide a suitable data link either to the surface or a mine location up to a mile away. The transmission should be able to operate for at least 10 days on a single battery charger. Other types of mine conditions like temperatures, pressures of ambient gases or rock formation, the methane, carbon dioxide, or carbon monoxide content of the mine gas, etc., could just as well be monitored by this invention.

To achieve the desired transmission link underground the basic principles employed in Frequency Shift Keying (FSK) have been modified. Typically the telemetering of data using FSK techniques would require the continuous sending of a narrow bandwidth wave with two frequencies shifted slightly above and below the center of the bandwidth frequency. When received these two frequencies are decoded to represent either a binary "1" or a binary "0." Such system are used extensively by the military and teletype industry to transmit data between points. What we have developed is a wireless FSK technique which is based on a low frequency approach specifically designed for applications where low voltage and low power are absolute requirements in the telemetry transmitter. The duration of the tone bursts representing the data bits was 25 milliseconds (ms). And for the dual frequencies, 2500 and 2564 hertz (Hz) signals were used. These low frequencies were selected since they are capable of easily penetrating the conducting medium (earth) over sufficient distances to be practical for telemetry purposes. Using short tone bursts allowed much of the transmitter's battery power and life to be conserved while transmitting over only about 2.5 percent of the total duty cycle. When the incoming stream of data pulses in our preferred embodiment are received there is automatic synchronization at the receiver. To achieve this, the leading edges of the pulses are recognized and used to generate an extended duration pulse at the data shift register for each logical "one" that is transmitted. Then at the trailing edge of the received pulses, the data is automatically clocked into the data shift register. A logical "one" will be present at the input only when a logical "one" shift pulse is received. Likewise for logical "zeros," a zero will be clocked into the register at the appropriate time.

Two other important features of our preferred embodiment are its receiver alert code and its filtered exclusive OR network. The alert code is used to eliminate false data reception due to random noise pulses. It is made up of four bits of information. These four bits of information are sent to the receiver just prior to the transmission of each stream of new data. At the receiver these four bits must be received in proper sequence before it will respond to subsequent data to follow. In this way the probability that random noise pulses will upset the data retrieval and synchronization process in the system are greatly reduced. The exclusive OR network located in the receiver also functions to reduce the probability of error due to stray noise pulses. Tone burst pulse may be received at the two receiver channels in the form of a binary one at one channel or a binary zero at the other channel, but not both at the same time. If both types of tone bursts do appear simultaneously, then the pulse will not be effectively clocked into the shift register.

A better understanding of our invention is achieved by considering FIGS. 1 and 2. FIG. 1 is a block diagram of the FSK telemetry transmitter. A battery or other type of self contained power source is used to supply about 30 watts of peak power to the solid state switching amplifier shown. Through a series of six frequency divider circuits (three in series for each frequency) a crystal oscillator generating a 600 kHz pulse is divided until it is reduced to the two low frequency pulses of 2500 Hz ($f_1$) and 2564 Hz ($f_2$). These two frequencies are used to represent the binary ones and zeros at the receiver. An integrated circuit timer then controls the short 25 millisecond duration for these two pulse trains. With a 1 bit per second data transmission rate or total duty cycle time and a 25 millisecond tone burst duration for this rate the effective transmitter duty cycle for signal A is only 2.5 percent. The preferred embodiment for the illustrated crystal oscillator was a triple CMOS inverter network made by Motorola is type MC 14049 of Phoenix, Ariz. with a 600 kHz crystal made by International Crystal of Oklahoma City, Okla. in the feed bach path. Its output frequency was divided down in two parallel paths using CMOS Frequency Dividers, made by the Motorola Co. type were MC14518, and type MC14013 and RCA type CD4018 (Camden, N.J.). These dividers were wired in such a way as to produce a total division ratio of 240 down one path and 234 down the other path resulting in data frequencies of 2500 Hz and 2564 Hz respectively. These data frequencies were gated through to the output amplifier via CMOS Gates $G_1$, $G_2$, $G_3$, and $G_4$ (Motorola type MC14011). A Signetics NE555 timer (shift pulse generator) was used to limit the tone duration of 25 ms by enabling the output gate $G_4$ for only that length of time. The solid state switching amplifier was a Westinghouse designed full wave switch employing complementary power transistors Motorola MJ4032 and MJ4035 in a switching mode of operation. The square wave output of the Solid State switching amplifier was fed through a resonating capacitor $C_1$ to a loop antenna which usually consists of a single turn of wire wrapped around a coal pillar or deployed along the roof at an intersection in the mine.

The FIG. 2 block diagram shows the preferred embodiment of the telemetry receiver. The incoming stream of shift pulses of 0.025 seconds duration from the transmitter station are received at the loop antenna input. Thereafter a tuning fork is used to filter the narrowband pulses. The tuning forks, in the preferred embodiment were manufactured by Murata Corporation of America, of Elmsford, N.Y. with piezoelectric elements designed to respond to signals in an extremely narrow frequency band in the frequency range from 300 Hz to 3000 Hz. These units had an insertion loss of 10 d B which was compensated for in the Westinghouse system by appropriate gain factors in the preceding and following narrowband amplifier stages. The bandwidth of the receiver stage including the tuning fork was approximately 2 Hz. Basically, the FSK receiver uses a dual filter/envelope detector approach to detect the incoming stream of signals. Superimposed on this detection approach is the use of an exclusive OR gate which applies shift pulses to the receiver data shift register only when one or the other of the two channels in the dual filter receives a shift pulse but not both. Thus, in FIG. 2 unless signals D and E represent a binary 1 or 0 (or vice versa) there will be no output signal F. In this manner, if a sharp noise transient were to be received at the receiver, both channels would respond in nearly an identical manner since they are so close (64 Hz) in frequency. If this happened, the exclusive OR gate would sense two shift pulses at its input and its output signal F would be limited to only a tiny sliver of a pulse which would be filtered out by capacitor C. The exclusive OR gate gives no output signal F when no shift pulses are applied to its input i.e. when both of the signals E and D are nonexistent.

The alert code signals must be received by the receiver from the transmitter before any data bits are shifted into the shift register. This code consists of four bits of information. Recognition of this code in the receiver alert shift register and decoder in FIG. 2 enables the data shift register to receive the remaining bits of the transmitted digital bit stream and store the information for subsequent display or recording. In the preferred embodiment, the narrowband amplifiers in FIG. 2 consisted of a type A741 and a type A747 operational amplifier manufactured by Fairchild of Mt. View, Calif. The full wave detector and low pass filter utilized another type A747 operational amplifier by the same manufacturer. The threshold detector utilizes a A741 type operational amplifier and the pulse generator was a NE555 timer manufactured by Signetics of Sunnyvale, Calif. The preferred embodiment of the exclusive OR network was a MC14507 type CMOS chip manufactured by Motorola, Phoenix, Ariz. The receiver alert and data shift registers were all Motorola Type MC14015 static shift registers. These devices were used primarily for serial to parallel conversion where low power drain and high noise immunity was desired. The control flip flop was a Motorola type MC14027 dual JK flip flop. This was used to enable or disable the Receiver Alert Register and the Data Shift Register depending on whether data or receiver alert information was being transmitted. The display used in this preferred embodiment was a Digitec Model 6150 digital printer manufactured by United Systems Corp., Dayton, Ohio.

Although our invention has been described as it relates to a specific preferred embodiment and specific use in a mine it should not be limited thereto. Our invention is to be limited only by the spirit and scope of the claims to follow.

We claim:

1. A FSK telemeetery system for transmitting data pulses of different frequencies through the earth and for receiving and converting these transmitted pulses to binary data comprising:
   means for forming continuous narrow bandwidth pulses having either of two distinct low frequencies with each having its own total duty cycle;
   means for shortening the time duration of both of said formed continuous pulses to form pulses of tone bursts with the same distinct frequencies over no more than about ten percent of their respective total duty cycles;
   means for transmitting either of the two formed tone bursts through the earth;
   portable self contained power supply means for providing power to said forming, shortening and transmitting means;
   means for receiving said transmitted tone bursts after then have transversed through the earth, said receiving means having an exclusive OR circuit to reject received pulses when both of the distinct low frequency pulses are simultaneously present; and
   digital storage data means for storing said received pulses as binary representations thereof.

2. The system of claim 1 also including additional means for transmitting and receiving a receiver alert code prior to the receipt of said tone bursts at said receiving means.

3. The system of claim 1 wherein both said means for transmitting and receiving said tone bursts employ loop antennas at their respective output and input.

4. The system of claim 1 wherein said transmittable tone bursts are a series of pulses no more than 10 hertz wide with their two transmittable distinct low frequencies being less than 100 hertz apart and oscillating at no more than 5,000 hertz.

5. The system of claim 4 wherein said receiving means comprising two separate channels connected to the input of said exclusive OR gate, each of said channels having a tuning fork with narrowband amplifier.

6. The system of claim 4 wherein said forming means comprises:
- an oscillator for generating a wave of several thousand hertz; and
- a series of frequency dividers connected to the output of said oscillator to divide the wave into said two distinct frequencies.

* * * * *